United States Patent [19]
Edwards

[11] 3,962,168
[45] June 8, 1976

[54] NON-SKID COATING AND METHOD

[76] Inventor: Hugh K. Edwards, 5228 Page, St. Louis, Mo. 63112

[22] Filed: Jan. 24, 1974

[21] Appl. No.: 436,190

[52] U.S. Cl. ............... 260/29.6 RW; 260/29.6 RB; 260/33.6 UA; 260/998.13
[51] Int. Cl.² .................... C08J 3/02; C08J 3/10; C08L 35/02; C08L 35/06
[58] Field of Search ............ 260/29.6 RB, 998.13, 260/29.6 RW, 33.6 UA

[56] References Cited
UNITED STATES PATENTS

| | | | |
|---|---|---|---|
| 2,465,295 | 3/1949 | Strauss | 260/998.13 |
| 3,640,912 | 2/1972 | Reinhard et al. | 260/998.13 |

*Primary Examiner*—Allan Lieberman
*Attorney, Agent, or Firm*—Rogers, Eilers & Howell

[57] ABSTRACT

A new coating is composed of a compatible mixture of styrene acrylate polymers and polyvinyl acetate-acrylic co-polymers in a compatible organic-aqueous solvent system. The composition may contain extenders, fillers and pigments. A particularly useful application uses pulverized natural or synthetic rubbers to increase the resilience and skid resistance of the surface of the coated material. The coating is prepared by forming a solution of a styrene acrylate polymer in an organic solvent and blending the solution of styrene acrylate polymers in with an aqueous emulsion of a vinyl copolymer. Various pigments, fillers and extenders, such as clays, carbon blacks and pulverized rubber may be added to the mixture and the subsequent mixture is milled under conditions effective to produce a compatible, stable coating composition.

15 Claims, No Drawings

3,962,168

NON-SKID COATING AND METHOD

BACKGROUND OF THE INVENTION

The use of synthetic organic resinous materials for coatings and paints is well-known. The chemical resistance, relative strength and life of many of the synthetic resin materials have caused synthetic resins to gain a great deal of favor for such uses. Coatings incorporating synthetic resins have an attractive, smooth and glossy surface which make them highly desirable from the standpoint of appearance.

A smooth, shiny, relative non-porous surface tends to become extremely slippery, particularly when wet or oily, and is unsuitable for walkways and similar uses. Known methods of reducing slickness are to incorporate coarse, rough aggregates such as sand or silica into coatings to produce a rough, concrete-like surface or to broadcast or sprinkle a grit material such as sand or silica onto the surface of coated articles while the coating is still wet so that the sprinkled sand or silica adheres to the coating and presents a roughened surface when the coating dries.

The known methods of reducing coating slickness present difficulties however, particularly if the coating is applied in a high traffic area or on a flexible substrate. Silica or sand, when incorporated in coating matrices in proportions high enough to provide a non-skid surface, renders the coating material hard and inflexible, tending to cause the coating to crack or delaminate. If sand or silica is incorporated at a level low enough that the coating retains some of its flexibility, the quantity of the coating may be sufficient to enclose or incapsulate the grit which is incorporated into the vehicle, still leaving a smooth, slick surface exposed for the most part. If a grit material is sprinkled onto the surface of damp coating material or a coating material still in a moist condition, the grit material tends to be worn out of the coating or scuffed out, leaving a slick coating behind and also leaving a coating whose integrity has been impaired by the holes left by the worn out grit.

SUMMARY OF THE INVENTION

Applicant has discovered a resilient coating material which has inherent skid-resistance and presents a high friction surface when applied to a substrate. In addition, the inherent skid resistance can be increased by incorporating a pulverized rubber into the coating material. The rubber particles remain tightly bonded in the dried coating and are not scuffed out with wear.

The coating material is a combination of organic polymers in a dispersible co-solvent system. The preferred dispersible co-solvent system is a combination of organic solvent and an aqueous emulsion in which the organic polymers are dispersed. Rubber particles, if used, are also dispersed in the emulsion. The materials do not settle out or become unstable and will remain compatible during manufacture and storage.

The coating material is produced by milling an organic solution or dispersion of an acrylate polymer and an aqueous vinyl emulsion to form a compatible mixture. Fillers, pigments, and extenders may be added to the mixture during milling, including the ground rubber filler which is particularly useful in producing a resilient, non-skid coated surface.

DESCRIPTION OF THE PREFERRED EMBODIMENT

The product is prepared by a process which blends a solution or dispersion of styrene acrylate in an organic solvent with an aqueous emulsion of polyvinyl acetate-acrylic. The blend is milled to form a compatible coating material. Additional fillers and pigments, such as ground rubber, clays, carbon black, titanium dioxide, bentonite, iron oxides and similar materials may be used. Plasticizers may be added to increase the flexibility of the coating or to modify its properties, although these will not normally be needed due to the flexibility and stability of the resins which are used.

The organic solution or dispersion of styrene acrylate is made by mixing a styrene acrylate polymer having a molecular weight preferably between about 800 and 1000 in an organic solvent with agitation. Agitation is continued until a clear solution or dispersion is obtained. The solution is normally made up to contain from about 5 to 15% by weight styrene acrylate; normally a solution having about 12% solids would be used.

The solvents used are typically aromatic solvents such as xylene, toluene, or benzene. Glycol ethers, cyclohexanol, cyclohexane, mineral spirits and other equivalent solvents may also be used. Applicant has found that xylene is a particularly useful organic solvent to use when a pulverized rubber is used as a filling material to increase the skid resistance of the coating, since under the influence of the xylene, the rubber swells and increases its effective particle size in the coating and becomes even more adherent to the main portion of the resin matrix.

The polyvinyl acetate-acrylic co-polymer has a molecular weight preferably between about 100,000 and 120,000. The polymer is used as an aqueous emulsion having a polymer content of between about 50 and 60% by weight, normally an emulsion of about 55% by weight solids is used.

The ratio of mixing of the organic solution and the aqueous emulsion is in proportions of one to one for convenience, but this may be varied between broad limits of 2/1 to 1/2 or more depending upon the solids content of the organic solution and the aqueous emulsion employed and the solids content of resin which is desired in the final product. To the blend of resins in organo-aqueous solvent system is added the pigments, fillers, any plasticizers, if desired, and if an extremely resilient non-skid coating is desired, the pulverized rubber material. The material is then milled for from about 20 to 30 minutes.

The conditions of milling should be controlled to avoid incompatible conditions occurring in the resin mixture. We have found that a dual shaft disperser (milling device) is preferred and that it should preferably be operated between the speeds of about 1000 to 1500 rpm to avoid incompatible milling conditions. Care should be taken during the milling operation so that the heat of the milling produced by the viscous flow and the work of the milling operation does not cause the temperature of the mixture to rise above about 150°F or gelation may occur indicating the coating is incompatible and rendering it unsatisfactory for most normal uses.

At the end of the milling period, when the milling has been completed, a stable compatible coating material is produced, having a viscosity in the range of 95 to 125

KU (Stormer Units). For most purposes, particularly when coating is to be by the pneumatic spray techniques, a viscosity of 112 KU is preferred since high viscosities tend to be too heavy for optimum spray application and slows application of the coating. Viscosities below 95 KU are not usually satisfactory, particularly for spray applications, since the coating will tend to run or sag when applied to a surface of substrate and will not be deposited in a thick or heavy enough film. If, at the end of milling or even prior to application by spray, the viscosity is found to be too heavy, it can be adjusted merely by adding water while mixing.

The milled coating material normally contains between about 50–75% by weight of the mixed aqueous-organic solvent system, between about 4 to 8% by weight of the styrene acrylate polymer and between about 20 to 35% by weight of the polyvinyl acetate-acrylic co-polymer. Fillers, pigments, and plasticizers, if used, will make up the remainder of the coating material. If the ground rubber filler is used, it will normally be added at a level of between about 5 to 10% by weight of the coating.

Application of the product to a substrate may be by a variety of conventional techniques, typically, brushing and pneumatic spray. When pneumatic spray application methods are used, typically a standard acoustical sprayhead is found to perform most satisfactorily. The product will adhere to most clean dry surfaces, for example, wood, steel and aluminum, to form a tightly adhering and resilient coating material. The product cures under ambient conditions without the assistance of any cross-linking or catalyzing materials merely by the evaporation of the solvents present in the blend and coating composition. The presence of a high proportion of water in the coating eliminates or reduces the hazards and difficulties encountered with systems which are highly organic in that the fire hazards and toxicity hazards are appreciably reduced. Even with the high proportion of water in the cosolvent systems, the coating dries in a short time, typically in three hours to twenty four hours, depending upon the weather conditions, i.e., humidity and temperature of the surrounding environment.

EXAMPLE 1

A resilient coating material according to one aspect of the invention was prepared by dissolving one pound of styrene acrylate polymer (Marbon SAM, Borg-Warner Corporation, molecular weight 800–1000) in one gallon of xylene and mixing until a clear solution was obtained. The solution of styrene acrylate polymer and xylene was blended on a 1 to 1 basis (by volume) with an aqueous emulsion of polyvinyl acetate-acrylic co-polymer containing 55% solids by weight, molecular weight 100,000–120,000 (Washburn Lanson Lanflex 705). The blend was milled by a high speed disperser at a speed of 1000 rpm for 20 minutes to produce a clear, compatible coating. The coating was applied to plywood and allowed to cure for 24 hours under ambient conditions (70°F). The coating exhibited a high friction, resilient surface on curing and had good bond to the plywood.

EXAMPLE 2

A resilient coating material similar to that prepared in Example 1 was prepared by dissolving one pound of the styrene acrylate polymer used in Example 1 in one gallon of xylene, mixing until a clear solution was obtained and blending the solution of styrene acrylate polymer on a 1 to 1 basis by volume with the aqueous emulsion of polyvinyl acetate-acrylic copolymer used in Example 1. To this blend was added 3 pounds $TiO_2$ pigment and 3 pounds volclay and the total mixture was milled on a high speed disperser at a speed of 1000 rpm for 20 minutes to produce an opaque white-colored compatible coating. The coating was applied to plywood and allowed to cure for 24 hours under ambient conditions. The coating was achieved by spraying the mixture in a conventional spraying gun equipped with an acoustical nozzle. The cured coating exhibited a high-friction resilient surface and had good bond to the plywood.

EXAMPLE 3

An attempt was made to prepare a resilient coating material similar to that of Example 1 by blending the ingredients as disclosed in Example 1 and milling the blend on a disperser at a speed of 2000 rpm for 30 minutes. At the end of the milling time, the composition was observed and it was determined that the mixture was incompatible and had gelled to the point that it was not acceptable for normal coating operations using pneumatic spray application.

EXAMPLE 4

A pigmented coating, according to one aspect of the invention, was prepared by dissolving one pound of the styrene acrylate polymer used in Example 1 in one gallon of xylene and mixing until a clear solution was obtained. The solution of styrene acrylate polymer and xylene was blended on a 1 to 1 basis with an aqueous emulsion of the polyvinyl acetate-acrylic co-polymer as used in Example 1. To the blend were added 2 pounds $TiO_2$ and 2 pounds ground rubber and the total mixture was blended on a disperser at a speed of 1500 rpm for 30 minutes to produce a compatible pigmented coating. The coating was applied to plywood by conventional spray application using an acoustical spray head and allowed to cure for 24 hours under ambient conditions. The cured coating exhibited a high friction resilient surface having an opaque white color and the coating had extremely good bond to the plywood.

EXAMPLE 5

A pigmented resilient coating material, according to one aspect of the invention, was prepared by dissolving one pound of the styrene acrylate polymer used in Example 1 in one gallon of xylene and mixing until a clear solution was obtained. The solution of the styrene acrylate polymer and xylene was blended on a 1 to 1 basis (by volume) with the aqueous emulsion of polyvinyl acetate-acrylic co-polymer used in Example 1. Trace carbon black and ⅛ pound volclay were added to the blend and the total mixture was milled on a disperser at a speed of 1000 rpm for 30 minutes to produce a pigmented compatible coating. The coating was applied to a cold rolled steel by conventional spray means as disclosed in Example 5 and allowed to cure for 24 hours under ambient conditions (70°F). The coating exhibited a high friction resilient surface and had a dark grey-black opaque surface which had good bond to the strip. The material was extremely tough and judged to have excellent wear and friction resistance.

EXAMPLE 6

An attempt was made to prepare a coating material by blending the material of Example 5 with trace iron oxide. The blend was milled on a dual shaft disperser at a speed of 1000 rpm for 30 minutes at a temperature of about 165°F and was removed and examined. The material gave evidence of radical incompatibility. The product was gelled to the point that it was no longer acceptable as a coating material suitable for application by pneumatic spray methods.

EXAMPLE 7

A resilient coating material according to an aspect of this invention was prepared by dissolving one pound of the styrene acrylate polymer used in Example 1 in one gallon of xylene and mixing well until a clear solution was obtained. The solution of styrene acrylate polymer and xylene was blended on a 1 to 1 basis by volume with the aqueous emulsion of polyvinyl acetate-acrylic co-polymer used in Example 1. To this blend was added ½ pound pulverized rubber, 1½ pounds TiO$_2$, trace carbon black, ⅛ pound volclay and the total was milled on a disperser at a speed of 1000 rpm for 20 minutes to produce a compatible coating. The coating was applied to plywood by conventional spray means using an acoustical head spray gun and allowed to cure for 24 hours under ambient conditions. After curing, the coating exhibited a high friction resilient surface and good bond to the plywood. The coating was extremely tough and was judged to have excellent wear resistance.

EXAMPLE 8

A resilient coating material according to an aspect of this invention was prepared by dissolving one pound of the styrene acrylate polymer of Example 1 in one gallon of xylene and mixing until a clear solution was obtained. The solution of styrene acrylate polymer and xylene was blended on a 1 to 1 basis by volume with the aqueous emulsion of polyvinyl-acetate acrylic co-polymer used in Example 1. To this blend was added ⅛ pound clay, ¼ pound of a pulverized rubber having a particle size between 20 mesh and 30 mesh. The blend was milled on a high speed disperser at a speed of 1000 rpm for 20 minutes to produce a compatible coating. The coating was applied by conventional spray means using an acoustical spray head to plywood and allowed to cure for 24 hours under ambient conditions. On curing, the coating exhibited an extremely high friction, extremely resilient surface and had unusually good non-skid properties, both in dry condition and when wet with water. The coating material had excellent bond to the plywood and was judged to have excellent wear resistance.

EXAMPLE 9

An attempt was made to prepare a rubber-filled coating material similar to that prepared in Example 8 by blending the materials used in Example 8 and milling them on a high speed disperser at a speed of 1500 rpm for 30 minutes. At the end of the milling period, the material was observed and it was determined that it had gelled to the point that it was not satisfactory for use as a coating material suitable for pneumatic spray application.

EXAMPLE 10

A pigmented resilient coating material, according to one aspect of the invention, was prepared by dissolving one pound of the styrene acrylate polymer used in Example 1 in one gallon of xylene and mineral spirits (50/50) and mixing until a clear solution was obtained. The solution of the styrene acrylate polymer and 1 pound TiO$_2$ was blended on a 1 to 1 basis (by volume) with the aqueous emulsion of polyvinyl acetate-acrylic co-polymer used in Example 1. Trace carbon black and ⅛ pounds clay were added to the blend and the total mixture was milled on a high disperser at a speed of 1000 rpm for 30 minutes to produce a pigmented compatible coating. The coating exhibited a high friction resilient surface and had a dark grey-black opaque surface which had good bond to a plywood substrate. The material was extremely tough and judged to have excellent wear and friction resistance.

It will be appreciated that applicant has conducted a great number of experiments to arrive at the parameters of the invention disclosed and claimed and that the foregoing examples are included as exemplary and are not exhaustive of combinations which may be prepared using the techniques of the invention. All of the compatible coating compounds prepared as noted in Examples 1, 2, 4, 5, 7, 8 and 10 are suitable for application by conventional means, pneumatic spray application is best accomplished using a spray head of the acoustical type due to the viscosity and high solids content of the material sprayed. By using the material at this viscosity and high solids, it is possible to spray coat the material without appreciable dry spray or blow by and webbing to produce a uniform spray-coated surface. The coating on the surface has a relatively high solids content which will desolventize and dry within a reasonably short time. Due to the use of a high proportion of water in the total solvent system, the hazards and difficulties normally employed with high organic solvents and high solvent levels are significantly reduced or eliminated.

It will be understood by one skilled in the art that various changes or modifications may be made in addition to those described in the foregoing examples without departing from the scope of applicant's invention as defined in the following claims. It is intended that all matter which has been described in the foregoing specification shall be interpreted as being for purposes of illustration and not as limiting the invention claimed.

I claim:

1. A resilient coating material comprising a stable emulsion of a styrene acrylate polymer having a molecular weight of between about 800 and 1000 and a polyvinyl acetate-acrylic co-polymer having a molecular weight between about 100,000 and 120,000 in a dispersible aqueous-organic co-solvent system, the styrene acrylate polymer being present in proportions of between about 4 and 8% by weight and the polyvinyl acetate-acrylic co-polymer being present in proportions of between about 20 and 35% by weight, the co-solvent system being about 50 to 75% by weight of the emulsion.

2. The coating material of claim 1 wherein a particulate resilient rubber material is incorporated in the coating material at a level of between about 5 and 10% by weight.

3. The coating material of claim 1 wherein a particulate rubber material having a particle size between about 20 mesh and 30 mesh and is incorporated in the coating at a level of between about 5 and 10% by weight.

4. The coating material of claim 1 wherein the dispersible co-solvent system contains a mixture of xylene and mineral spirits.

5. A resilient slip resistant coating material comprising a stable, compatible emulsion of a styrene acrylate polymer having a molecular weight of between about 800 and 1000 and a polyvinyl acetate-acrylic co-polymer having a molecular weight between about 100,000 and 120,000 in an aqueous-organic co-solvent system, the emulsion containing between about 4 to 8% by weight of styrene acrylate co-polymer, between about 20 to 35% by weight polyvinyl acetate-acrylic co-polymer and compatible fillers and pigments, the aqueous-organic solvent system being between about 50 to 75% of the coating material.

6. The coating material of claim 5 wherein the compatible filler is selected from the group consisting of clay, carbon black, pulverized rubber and pigments.

7. The coating material of claim 5 wherein the coating has a viscosity between about 95–125 KU (Stormer Units).

8. The coating material of claim 5 wherein the coating has a viscosity of about 112 KU (Stormer Units).

9. The coating material of claim 1 wherein the viscosity of the emulsion is adjustable by addition of water and mixing.

10. A process of preparing a coating compound comprising dissolving a styrene acrylate resin having a molecular weight between about 800 and 1000 in a water dispersible organic solvent, mixing the resulting solution with a polyvinyl acetate-acrylic aqueous emulsion having a molecular weight between about 100,000 and 120,000, the ratio of mixing of the organic solution and the aqueous emulsion being between about 2/1 to 1/2, adding pigments and fillers to the mixture and milling the mixture pigments and fillers under conditions effective to form a stable, compatible compound having between about 4 to 8% styrene acrylate, between about 20 to 35% polyvinyl acetate-acrylic and between about 50 to 75% solvents, the milling being controlled to keep the temperature of the mixture below about 150°F.

11. The method of claim 10 wherein the coating compound is milled for between about 20 minutes and 30 minutes using a high speed disperser mixer at a speed of between 1000 and 1500 rpm.

12. The method of claim 10 wherein the filler is selected from the group consisting of clay, carbon black, pulverized rubber and titanium dioxide.

13. The method of claim 10 wherein the viscosity of the milled coating compound is adjusted to between about 95 to 125 KU (Stormer Units).

14. The method of claim 10 wherein the viscosity of the milled coating compound is adjusted to 112 KU (Stormer Units) by adding additional water and mixing.

15. The method of claim 1 wherein a pulverized rubber filler having a particle size between about 20 mesh and 30 mesh is added to the mixture.

* * * * *